United States Patent
Amorin et al.

(10) Patent No.: US 7,451,242 B2
(45) Date of Patent: Nov. 11, 2008

(54) SYSTEMS AND METHODS FOR PROVIDING NETWORK ACCESS

(75) Inventors: Rui M. Amorin, Fairport, NY (US);
Marc C. Keller, Webster, NY (US);
Robert S Westfall, Rochester, NY (US);
James R York, Webster, NY (US);
Thomas Higgins, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 455 days.

(21) Appl. No.: 09/939,937

(22) Filed: Aug. 27, 2001

(65) Prior Publication Data

US 2003/0041148 A1 Feb. 27, 2003

(51) Int. Cl.
*G06F 15/16* (2006.01)
*H04L 12/28* (2006.01)

(52) U.S. Cl. ............................... 709/253; 370/257

(58) Field of Classification Search ............... 709/224, 709/227, 251, 252, 253; 370/254, 351, 257
See application file for complete search history.

(56) References Cited

U.S. PATENT DOCUMENTS

| | | | | |
|---|---|---|---|---|
| 5,414,708 A | * | 5/1995 | Webber et al. | 370/445 |
| 5,596,575 A | * | 1/1997 | Yang et al. | 370/468 |
| 5,754,552 A | * | 5/1998 | Allmond et al. | 370/465 |
| 5,872,781 A | * | 2/1999 | Bennett et al. | 370/365 |
| 5,883,894 A | * | 3/1999 | Patel et al. | 370/438 |
| 6,122,514 A | * | 9/2000 | Spaur et al. | 455/448 |
| 6,434,716 B1 | * | 8/2002 | Johnson et al. | 714/712 |
| 6,523,070 B1 | * | 2/2003 | Stapleton et al. | 709/250 |
| 6,603,741 B1 | * | 8/2003 | Poulter et al. | 370/252 |
| 2002/0041591 A1 | * | 4/2002 | Hlluchyj | 370/354 |
| 2002/0188750 A1 | * | 12/2002 | Li | 709/235 |

OTHER PUBLICATIONS

Bae, Sungho et al. "In-service Monitoring of Cascaded EDFA WDM links Using Counter-propagating OTDR Pulses", Oct. 18-22, 1999, Fifth Asia Pacific Conference, vol. 1, pp. 436-437.*

* cited by examiner

*Primary Examiner*—Andrew Caldwell
*Assistant Examiner*—Benjamin Ailes
(74) *Attorney, Agent, or Firm*—Nixon Peabody LLP

(57) ABSTRACT

Systems and methods for providing network access using network controllers and network interfaces. A network controller has one or more subsystems including a monitoring system that monitors a plurality of communication paths to detect a presence of link pulses in one of the communication paths, a communication providing system that routs the available network signal to a first device, and a communication halting system that prevents the available network signal from being transmitted to one or more other devices. A network interface has a first circuit path routing a first network signal received at a first input of the network interface to a first device. Moreover, the network interface has a second circuit path routing a second network signal received at a second input of the network interface to a first output of the first network interface to be received at a first input of a second network interface.

24 Claims, 4 Drawing Sheets

SYSTEMS AND METHODS FOR PROVIDING NETWORK ACCESS

FIELD OF THE INVENTION

This invention relates generally to network architecture and, more particularly, to methods and systems for controlling and providing network access using controllers and interfaces.

BACKGROUND OF THE INVENTION

Some systems such as 10BaseT networks require dedicated network buses between a central server and each piece of equipment located on the network. Often, the network buses are routed external to the equipment, such as along or behind a floor, walls or ceiling, or through passageways within the equipment. This arrangement makes it difficult to set up, rearrange, add and remove equipment in the network.

Referring to FIG. 1, an exemplary network 10 of devices 14(1)-14(7) arranged in a star topology is shown. In this example, each one of devices 14(1)-14(7) is coupled to a hub server 12 by conventional cables 16(1)-16(7). Devices 14(1)-14(7) are not location specific with respect to the hub server 12, and thus may be interchanged and moved depending on need. For example, device 14(1) maybe swapped with device 14(7). Conventional cables 16(1)-16(7) have varying lengths, however, making it difficult to relocate devices 14(1)-14(7). Moreover, in these types of systems conventional cables 16(1)-16(n) are often bundled together, and thus the greater number of devices 14(1)-14(7) there are, the greater the diameter of the bundled conventional cables 16(1)-16(7). This may make it difficult to access the conventional cables 16(1)-16(7) within the bundles, and may therefore make it inconvenient to service the devices 14(1)-14(7). Further, the reliability of exemplary network 10 may be substantially lowered due to the human interaction with the bundles during servicing. Efforts have been made to deal with the above-noted problems, such as employing 10Base2 or MIL-STD-1553 network buses to serially couple equipment. However, these attempts have not been completely successful since the network buses may not meet other system or network requirements.

SUMMARY OF THE INVENTION

A system for identifying one of a plurality of communication channels for communication with one of a plurality of devices in accordance with the present invention includes a monitoring system that monitors each of the plurality of communication channels for one or more link pulses for one of the devices, and a controller that establishes a connection to the device with the communication channel monitored to have the link pulses.

A method and a program storage device readable by a machine tangibly embodying a program of instructions executable by the machine for a method of identifying one of a plurality of communication channels for communication with one of a plurality of devices in accordance with the present invention includes monitoring each of the plurality of communication channels for one or more link pulses for one of the devices and establishing a connection to the device with the communication channel monitored to have the link pulses.

A bus system for coupling a plurality of devices together to a base unit in accordance with the present invention includes a first plurality of substantially identical interface units, each of the first plurality of interface units having a plurality of connectors, at least one connector n in the plurality of connectors in one of the first plurality of interface units being coupled to a connector n+1 in the plurality of connectors in the interface unit in the first plurality of interface units, which is immediately preceding and coupled closer to the base unit.

A method for coupling a plurality of devices together to a base unit in accordance with the present invention includes providing a first plurality of substantially identical interface units, each of the interface units having a plurality of connectors, and coupling at least one connector n in the plurality of connectors in one of the first plurality of interface units to a connector n+1 in the plurality of connectors in the interface unit in the first plurality of interface units, which is immediately preceding and coupled closer to the base unit.

The present invention provides a number of advantages, including enabling equipment in a network to be conveniently rearranged, added or removed as desired. In addition, the present invention enables easier servicing of network communication buses since they do not have to be bundled together. The present invention also lowers cost and increases reliability since network equipment may be provided with a simple, universal network interface arrangement.

DETAILED DESCRIPTION OF THE INVENTION

Figure 1:
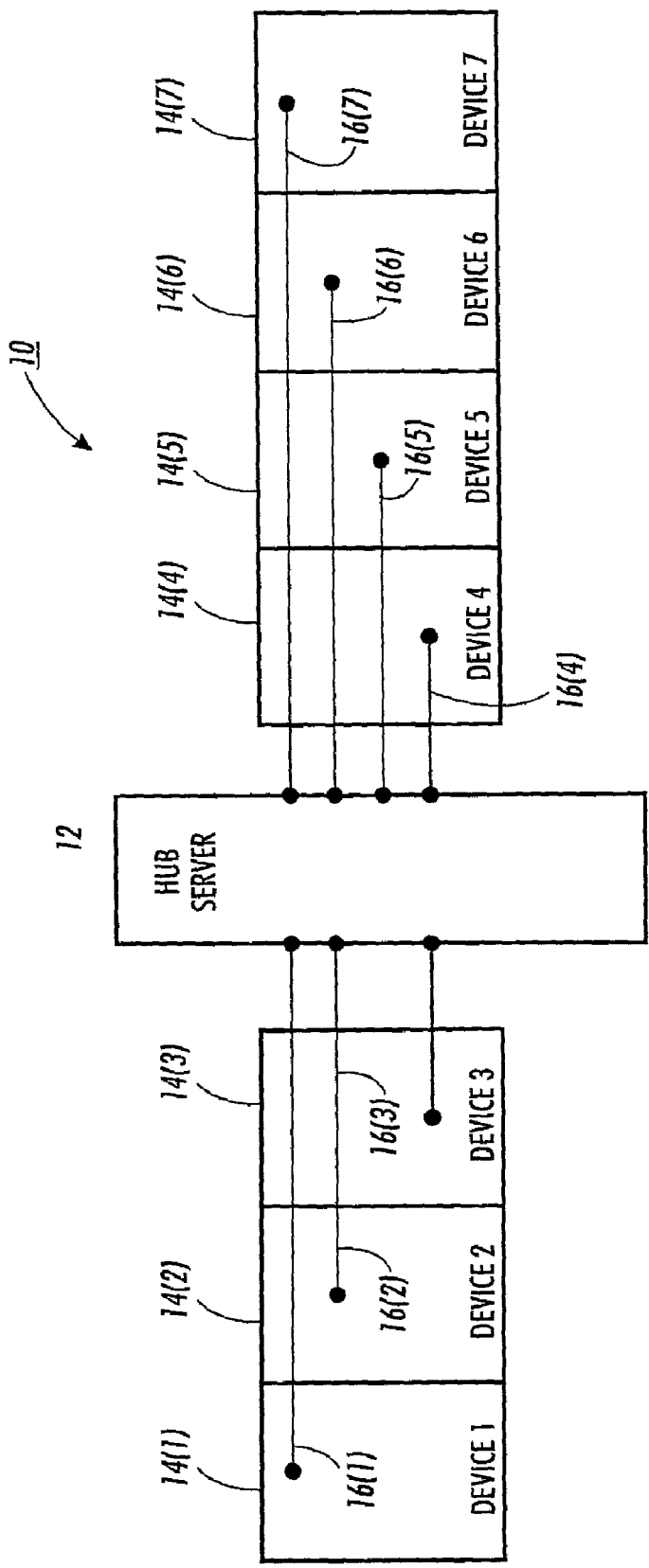
FIG. 1 is a block diagram of a conventional network of devices arranged in a star topography.
Figure 2:
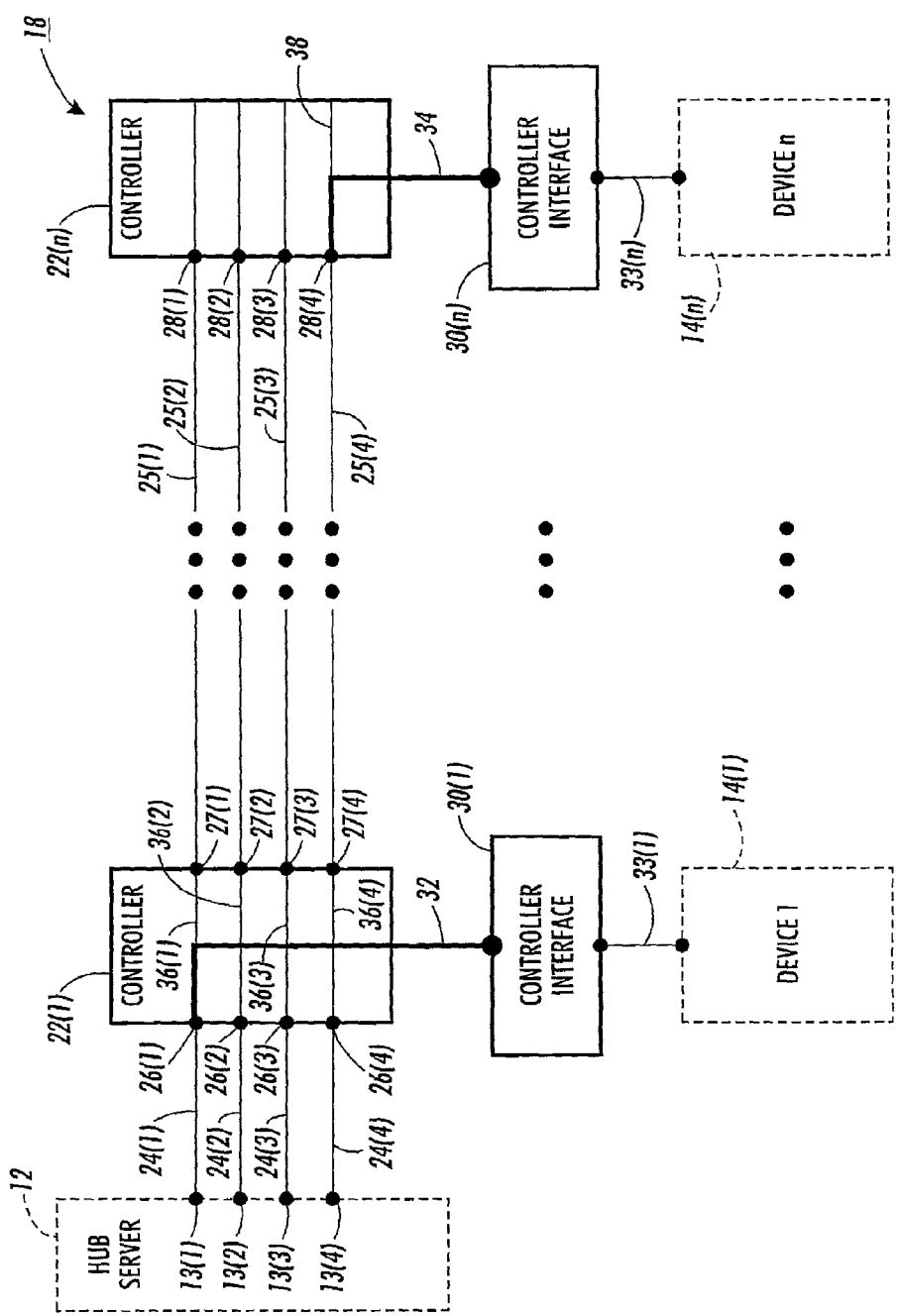
FIG. 2 is a block diagram of a system of network controllers for providing network access to one or more devices in accordance with one embodiment.
Figure 3:
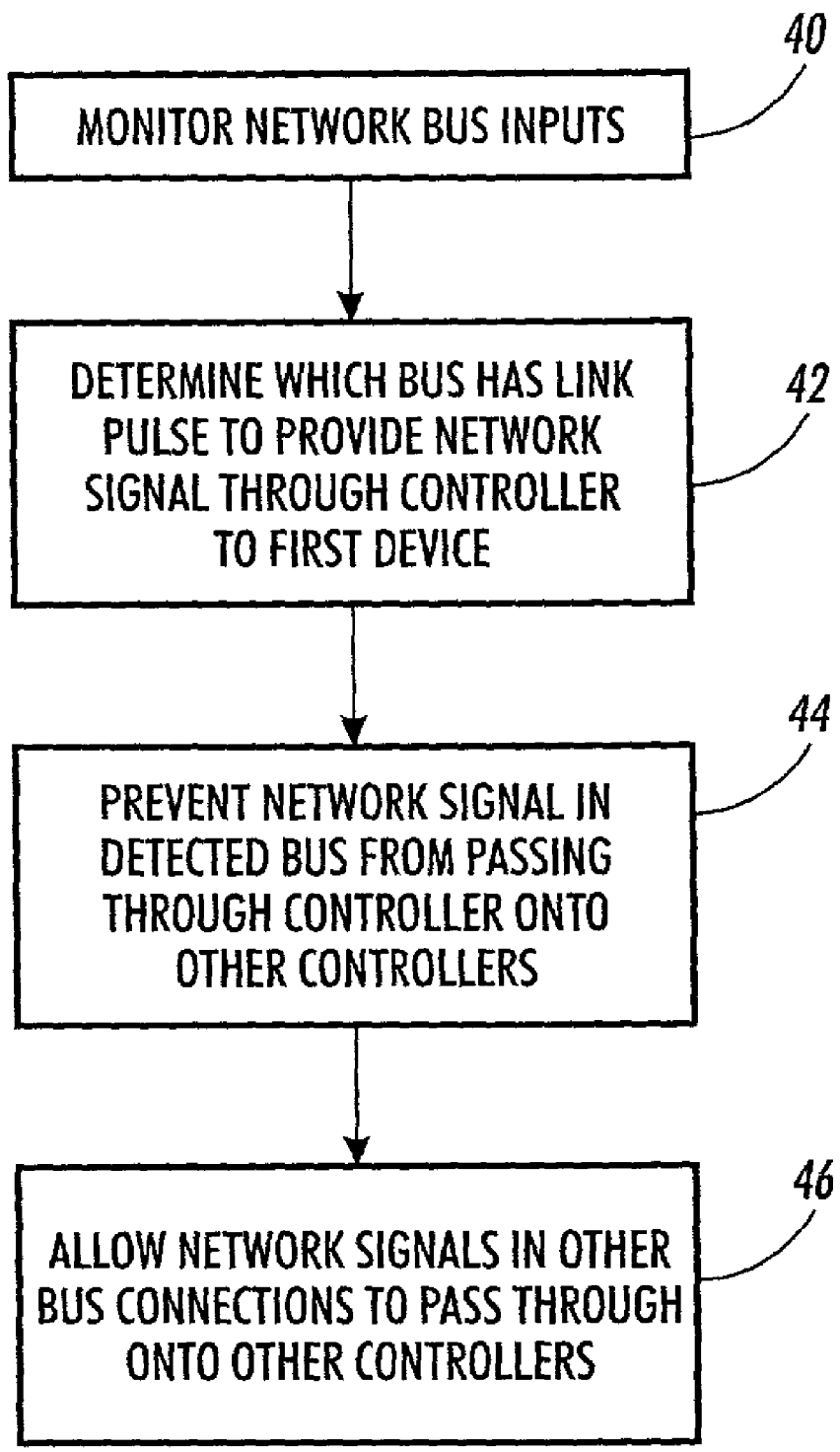
FIG. 3 is a flow chart of a process for providing network access to one or more devices.

A system 18 and method for providing network access in accordance with one embodiment of the present invention is illustrated in FIGS. 2-3. System 18 includes controller 22(1) coupled to hub server 12 by way of buses 24(1)-24(4) and controller 22(n) coupled to controlled 22(1) by way of buses 25(1)-25(4). Controllers 22(1)-22(n) are coupled to devices 14(1)-14(n) by way of controlled interfaces 30(1)-30(n), respectively. Controller interfaces 30(1)-30(n) enable devices 14(1)-14(n)to communicate with controlled 22(1)-22(n) as described further herein. The present invention provides a number of advantages, including enabling devices 14(1)44(n) to be conveniently rearranged, added or removed as desired in system 18. In addition, the present invention enables buses 24(1)-24(4) and 25(1)-25(4) to be more easily serviced, while increasing the reliability of system 18.

Referring more specifically to FIG. 2, controller 22(1) includes inputs 26(1)-26(4) for receiving buses 24(1)-24(4) originating from ports 13(1)-13(4) of hub server 12. Controller 22(1) may include a fewer or greater number of inputs 26(1)-26(4), and the number may or may not depend upon the number of ports 13(1)-13(4) there are in hub server 12. Controller 22(1) includes circuitry, switches and other components necessary for implementing the present invention as described further herein. Moreover, controller 22(1) includes controller connections 36(1)-36(4) that route network signals received at inputs 26(1)-26(4) to outputs 27(1)-27(4), except as explained further herein below. Additionally, controller 22(1) may comprise an LED light for debugging purposes, for example, to indicate which one of buses 24(1)-24(4) is providing device 14(1) with a network signal.

Controller 22(1) further comprises one or more processors and one or more memory storage devices, which are coupled together by a bus, to control the circuits, switches and other components mentioned above. The processor may execute a program of stored instructions for a method of providing network access in accordance with one embodiment of the present invention as described and illustrated herein. The instructions may be expressed as executable programs written in a number of computer programming languages, such as BASIC, Pascal, C, C++, C#, Java, Perl, COBOL, FORTRAN, assembly language, machine code language or any computer code or language that may be understood and performed by the processor. In other embodiments, controller 22(1) may comprise any type of device having circuitry that is hardwired to execute instructions for performing the one or more methods of the present invention. The memory in controller 22(1) in this embodiment may comprise any type of memory device accessible by the processor, and may store the program of stored instructions. Examples of such devices include ferroelectric memory, read only memory ("ROM"), random access memory ("RAM"), electrically erasable programmable read only memory ("EEPROM"), erasable programmable read only memory ("EPROM"), flash memory, static random access memory ("SRAM"), dynamic random access memory ("DRAM"), ferromagnetic memory, charge coupled devices, or equivalents thereof. Further, the memory may comprise any type of portable computer-readable media such as floppy-disks, hard-disks, Zip® disks, Compact Disks ("CD"), Digital Video Disks ("DVD"), computer-readable cassette tapes or reels, magnetic tapes, optical disks, smart cards or computer-readable punch cards.

In this embodiment, controller 22(n) is the same as controller 22(1) except that it instead receives buses 25(1)-25(4) through inputs 28(1)-28(4), the buses 25(1)-25(4) originating from the outputs 27(1)-27(4) of controller 22(1). Accordingly, controller 22(1) may include controller connections 38, for example. Additionally, while only controllers 22(1)-22(n) are shown, system 18 may also include controllers 22(2)-22(3), for example. Controllers 22(2)-22(3) in this example are the same as controller 22(n), each including inputs where buses from a preceding example are the same as controller 22(n), each including inputs where buses from a preceding controller are coupled to, and outputs where the buses that continue on to a next controller are coupled to. Additionally, while controller 22(1)-22(n) are shown herein as being coupled to each other by buses, they may also be coupled directly to each other.

In this particular embodiment, controller interfaces 30(1)-30(n) provide an interface between devices 14(1)-14(n) and controllers 22(1)-22(n), respectively, to enable devices 14(1)-14(n) to receive network signals from hub server 12. In particular, controller interfaces 30(1)-30(n) include the necessary circuitry to provide devices 14(1)-14(n) with access to hub server 12 through network connections 32 and 34 established by controllers 22(1)-22(n) as described further herein. While controllers 22(1)-22(n) and controller interfaces 30(1)-30(n) are shown as separate components, they may be physically located within devices 14(1)-14(n), for example.

Hub server 12 comprises a computer system such as a server system. Hub server 12 includes ports 13(1)-13(4), which couple hub server 12 to controller 22(1) by way of buses 24(1)-24(4). Moreover, each of ports 13(1)-13(4) provide a communication channel to each of devices 14(1)-14(n) as described further herein. Hub server 12 may include a fewer or greater number of ports 13(1)-13(4). Accordingly, there maybe a fewer or greater number of buses 24(1)-24(4). Since the components of a computer system such as hub server 12 and their operation are well known, they will not be described further herein.

In another embodiment, devices 14(1)-14(n), which may comprise any of the types of memory described above, stores the one or more methods of the present invention as a program of instructions. The stored instructions in this example would be executed by one or more processors of devices 14(1)-14(n). Devices 14(1)-14(n) are coupled to controller interfaces 30(1)-30(n) in this example by way of device connections 33(1)-33(n). Moreover, controller interface 30(1)-30(n) are coupled directly to hub server 12 by way of buses 24(1)-24(4) and 25(1)-25(4). Furthermore, each set of device 14(1) and controller interface 30(1) and device 14(n) and controller interface 30(n) may be physically located in the same location.

Referring to FIG. 3, the operation of system 18 for providing network access in accordance with one embodiment of the present invention will now be described.

Initially at step 40, controller 22(1) monitors each one of buses 24(1)-24(4) for a network signal. A network signal in this embodiment includes data that are being transmitted to or from hub server 12 and link pulses transmitted from hub server 12 when the data are not being transmitted. Link pulses are transmitted at predetermined time intervals such as 16.8 ms, although other time intervals may be utilized. When link pulses are detected in one of buses 24(1)-24(4) in this embodiment, controller 22(1) will assume that the particular one of buses 24(1)-24(4) is available. In this embodiment, controller 22(1) first checks bus 24(1) to determine whether link pulses are present, although controller 22(1) may instead check bus 24(2) first, for example. Controller 22(1) will continue to monitor buses 24(1)-24(4) until it detects the presence of link pulses in one of them.

Next at step 42, controller 22(1) detects the presence of a link pulse in bus 24(1). In this example, controller 22(1) then establishes a network connection 32 to controller interface 30(1) through device connection 33(1) by engaging and operating the appropriate switches and circuitry within controller 22(1). Once the network connection 32 is established, controller interface may begin receiving network signals and provide them to device 14(1) through device connection 33(1). Controller 22(1) may then cause the LED light mentioned above to illuminate for indicating that device 14(1) is communication with hub server 12 using bus 24(1).

Next at step 44, controller 22(1) prevents the network signals from being transmitted through controller connection 36(1) to output 27(1), and hence controller 22(n), by engaging and operating the appropriate switches and circuitry. In particular, controller 22(1) issues a state of high impedance in controller connection 36(1), and hence bus 25(1), as shown by the dashed lines in FIG. 2. Therefore, network controller 22(n) will not be able to receive through bus 25(1) the network signals transmitted from port 13(1) of hub server 12.

Next at step 46, controller 22(1) allows any network signals present in buses 24(2)-24(4) to be transmitted through controller connections 36(2)-36(4) and to exit controller 22(1) at outputs 27(2)-27(4). The network signals are transmitted from outputs 27(2)-27(4) through buses 25(2)-25(4) into controller 22(n). In this embodiment, controller 22(n) performs the same procedures described above with respect to steps 40-46, except that in this example it will not detect the presence of link pulses in bus 25(1) since controller 22(1) is utilizing the network signal being transmitted through bus 24(1) as described above in step 42. Thus, controller 22(n) will next check bus 25(2) to determine whether a link pulse is present, although again, other buses 25(3)-25(4) may be checked instead. Once controller 22(n) detects a link pulse in one of buses 25(2)-25(4), it performs steps 42-46 as described above.

In another embodiment, controller 22(n) performs the same procedures described above with respect to steps 40-46, except that in this example at step 42, controller 22(n) does not detect the presence of link pulses in buses 25(2) or 25(3). As noted above, while only controllers 22(1)-22(n) are shown, system 18 may include additional controllers 22(2) and 22(3). Here, controllers 22(2)-22(3) perform steps 40-46 as described above, and thus prevent network signals from being transmitted through buses 25(2)-25(3) as described above in step 44. Thus, controller 22(n) in this example would instead detect the link pulses in bus 25(4) at step 42, for example, and perform steps 44-46 as described above.

In another embodiment, controller 22(1) does not perform steps 40-46 as described above until controller 22(1) achieves an active state. Before controller 22(1) begins performing steps 40-46, it may be in an inactive state (i.e., powered down), or in the process of achieving an active state (i.e., powered up). Network signals transmitted through buses 24(1)-24(4) to controller 22(1) would be transmitted through controller connections 36(1)-36(4) to controller 22(n) through buses 25(1)-25(4) as described in step 46. For instance, controller 22(n) may achieve an active state before controller 22(1) is able to. Thus, controller 22(n) performs steps 40-42 and detects the presence of link pulses in bus 25(1) and therefore utilizes the network signal transmitted through bus 25(1). Controller 22(n), however, may eventually be required to repeat steps 40-46 and again monitor buses 25(1)-25(4) for the presence of link pulses since controller 22(1) may subsequently achieve an active status. In particular, once controller 22(1) achieves an active status, controller 22(1) performs steps 40-46 as described above. Since bus 24(1) originates from hub server 12 and is coupled directly to controller 22(1), assuming controller 22(1) in step 42 first checks bus 24(1) for the presence of link pulses, it will detect the link pulses being transmitted through bus 24(1) and perform steps 42-46 thereby halting the network signal being received by controller 22(n) through bus 25(1). Controller 22(n) upon detecting that the network signal has been halted repeats steps 40-46 as described above.

A system 50 for providing one or more devices with network access in accordance with another embodiment of the present invention will now be described in accordance with FIG. 4. System 50 includes network interfaces 52(1)-52(n), interface extender 80 and sub-base unit 81. Moreover, system 50 includes network interface 52(1) coupled to hub server 12 by way of buses 24(1)-24(4), network interface 52(2) coupled to network interface 52(1) by way of buses 66(1)-66(3), interface extender 80 coupled to network interface 52(2) by way of buses 74(1)-74(2), network interface 52(3) coupled to interface extender 80 by way of buses 90(1)-90(4), and network interface 52(n) coupled to network interface 52(3) by way of busses 98(1)-98(3). Further, network interfaces 52(1)52(n) are coupled to devices 14(1)-14(2) and 14(4)-14(n) by way of device connections 33(1)-33(2) and 33(4)-33(n), and sub-base unit 81 is coupled to device 14(3) by way of device connection 33(4). In this embodiment the hub server 12 is the same as described above with respect to system 18, except it is coupled to network interface 52(1) as described further herein.

Figure 4:
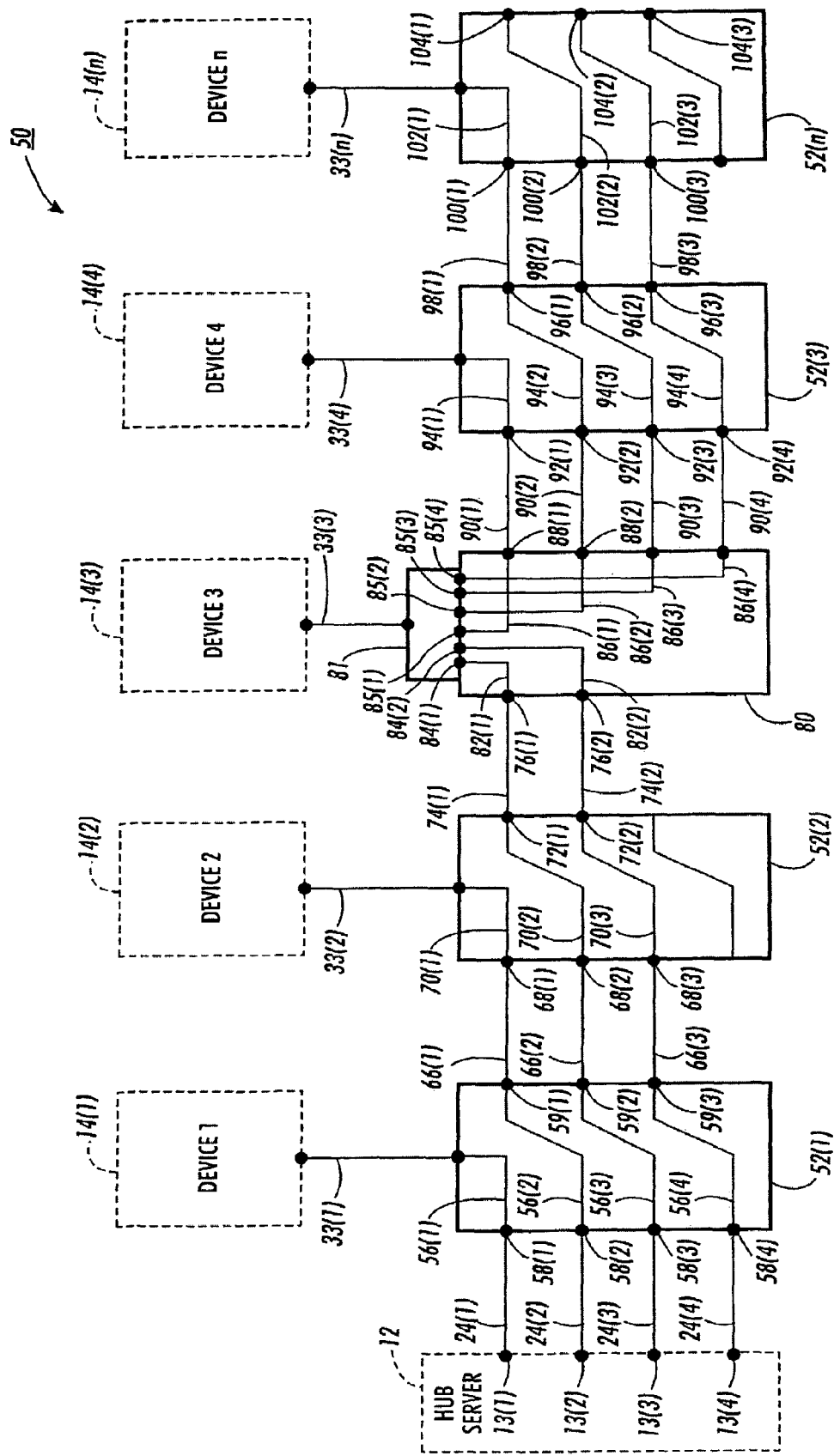
FIG. 4 is a block diagram of a system of network interfaces providing one or more devices with network access in accordance with another embodiment.

Referring more specifically to FIG. 4, network interface 52(1) includes inputs 58(1)-58(4). Buses 24(1)-24(4), originating from ports 13(1)-13(4) of hub server 12, are coupled to inputs 58(1)-58(4). Network interface 52(1) may include a fewer or greater number of inputs 58(1)-58(4), and the number may or may not depend upon the number of ports 13(l)-13(4) there are in hub server 12. Network interface 52(1) includes circuit paths 56(1)-56(4), which are coupled to inputs 58(1)-58(4) and outputs 59(1)-59(3). In this embodiment, network interface 52(1) does not require any additional switches, circuitry or processors except as described further herein below.

Network interface 52(2) is the same as network interface 52(1) except that it is instead coupled to buses 61(1)-66(3) at inputs 68(1)-68(3) and buses 74(1)-74(2) at outputs 72(1)-72(2). Moreover, network interface 52(2) includes circuit paths 70(1)-70(3), which are coupled to inputs 68(1)-68(3), device 14(2) through device connection 33(2) and to outputs 72(1)-72(2). Network interface 52(3) is the same as network interface 52(2) except that it is instead coupled to buses 90(1)-90(4) at inputs 92(1)-92(4). Moreover, network interface 52(3) includes circuit paths 94(1)-94(4), which are coupled to inputs 92(1)-92(4), device 14(4) through device connection 33(4) and to outputs 96(1)-96(3). Network interface 52(n) is the same as network interface 52(2) except that it is instead coupled to buses 98(1)-98(3) at inputs 100(1)-100(3). Moreover, network interface 52(n) includes circuit paths 102(1)-102(3), which are coupled to inputs 100(1)-100(3), device 14(n) through device connection 33(n) and to outputs 104(1)-104(3). Additionally, while network interfaces 52(1)-52(n) and interface extender 80 are shown herein as being coupled to each other by buses, they may also be coupled directly to each other.

In another embodiment of the present invention, an interface extender 80 is coupled to network interface 52(2) to enable additional network interfaces 52(1)-52(n) to be added as desired. In particular, buses 74(1)-74(2), originating from outputs 72(1)-72(2) of network interface 52(2), are coupled to inputs 76(1)-76(2) of interface extender 80. Further, interface extender 80 includes extender circuit paths 82(1)-82(2) coupled to extender inputs 76(1)-76(2) and a sub-base unit 81 at sub-unit inputs 84(1)-84(2). Moreover, extender circuit paths 86(1)-86(4) are coupled to sub-unit outputs 85(1)-85(4) and extender outputs 88(1)-88(2).

Sub-base unit 81 is the same as hub server 12, except it comprises sub-base inputs 84(1)-84(2) for receiving network signals originating from hub server 12 and routed through network interfaces 52(1)-52(2). Moreover, sub-base unit 81 comprises sub-base outputs 85(1)-85(4) for routing network signals to network interfaces 52(3) and 52(n) as described further herein. In this embodiment, sub-base unit 81 is coupled to interface extender 80 at sub-base inputs 84(1)-84(2) and sub-base outputs 85(1)-85(2), and is coupled to device 14(3) by way of device connection 33(3).

The operation of system 50 for providing network access in accordance with another embodiment of the present invention will now be described.

Network signals received at input 58(1) of network interface 52(1) are transmitted through circuit path 56(1) and routed directly to device 14(1) by way of device connection 33(1). Network signals received at the inputs 58(2)-58(4) are routed by way of circuit paths 56(2)-56(4) to outputs 59(1)-59(3). Circuit paths 56(2)-56(3) route network signals received at inputs 58(2)-58(3) from buses 24(2)-24(3) to outputs 59(1)-59(2). Moreover, circuit path 56(4) routes the network signals received at input 58(4) to output 59(3). Network signals received at inputs 68(1)-68(3) of network interface 52(2) are transmitted through circuit paths 70(1)-70(3), routed directly to device 14(2) by way of device connection 33(2) and to outputs 72(1)-72(2) in the same manner as described above with respect to network interface 52(1).

Interface extender 80 routes network signals received at input 76(1) through circuit path 82(1) into sub-base unit 81 at sub-base input 84(1). Moreover, sub-base unit 81 routes the network signal directly to device 14(3) through device connection 33(3). Interface extender 80 routes the network signals received at input 76(2) through circuit path 82(2) into sub-base unit 81 at sub-base input 84(2). Sub-base unit 81 routes the network signals received at sub-base input 84(2) to sub-base output 85(1). Interface extender 80 routes the network signals through extender circuit path 86(1) to extender output 88(1). The network signals are transmitted from interface extender 80 by way of bus 90(1) to network interface 52(3), where the signals are received at input 92(1). Network interface 52(3) routes the network signals to device 14(4) in the same manner as described above with respect to network interfaces 52(1)-52(2).

Sub-base unit 81 also routes network signals originating from sub-base unit 81 to network interface 52($n$). In particular, the network signals originating from sub-base unit 81 are routed from sub-base output 85(2) through extender circuit path 86(2) to extender output 88(2) of interface extender 80. The network signals are transmitted from interface extender 80 by way of bus 90(2) to network interface 52(3), where the signal is received at input 92(2), is transmitted through circuit path 94(2) to output 96(1), through bus 98(1), and is received at input 100(1) of network interface 52($n$). Network interface 52($n$) routes the network signals to device 14($n$) in the same manner as described above with respect to network interfaces 52(1)-52(2) and 52(3).

Therefore, for example, network signals transmitted from hub server 12 at port 13(2), for example, travel through bus 24(2) into network interface 52(1) through input 58(2), through circuit path 56(2), through output 59(1), through bus 66(1), and finally into network interface 52(2) through input 68(1). Within network interface 52(2), the network signals received at input 68(1) are routed through circuit path 70(1), out of network interface 52(2), through device connection 33(2) and finally to device 14(2). Moreover, network signals received at input 68(2) of network interface 52(2) from network interface 52(1) are routed through circuit path 70(2) to output 72(1), through bus 74(1), and finally to interface extender 80, where the signals are routed to device 14(3) as described above.

In another embodiment, network signals may be transmitted from one or more network interfaces 52(1)-52($n$), interface extender 80 and sub-base unit 81 to hub server 12 in the same manner as the network signals are transmitted from hub server 12 to one or more network interfaces 52(1)-52($n$), interface extender 80 and sub-base unit 81 as described above in one or more embodiments, except in the reverse order as described further herein. For instance, a network signal originating from network interface 52(3) may be transmitted from network interface 52(3) through input 92(1), bus 90(1), into interface extender 80 at output 88(1), and into sub-base unit 81 at sub-base unit output 85(1). The network signal is then transmitted from sub-base unit 81 at sub-base unit input 84(2) to input 82(2) of interface extender 80 through bus 74(2) and to network interface 52(2) at output 74(2). Next, the network signal is transmitted through circuit path 70(3) to input 68(3), through bus 66(3) and network interface 52(1) in the same manner as with network interface 52(2), and through bus 24(4) to hub server 12. Hub server 12 receives the network signal at port 13(4).

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefor, is not intended to limit the claimed processes to any order except as may be specified in the claims.

What is claimed is:

1. A method for identifying at least one of a plurality of communication channels available for communication between one of a plurality of devices and a server, wherein the plurality of communication channels are formable between the server and cascadedly arranged controllers, each controller associated with one of the devices, including n inputs, n>1, and a switching device configured to allow connection between one of the n inputs and the associated device and connection through the controller between the remaining n−1 inputs and n−1 outputs, the method comprising:

monitoring, at each of the cascadedly arranged controllers, each of the plurality of communication channels between the controller and the server, wherein the n inputs of each succeeding controller in the cascade are respectively connected in series to n outputs of a preceding one of the controllers;

determining whether at least one of the plurality of communication channels is being used for the transmission of link pulses generated by the server, wherein the presence of link pulses on one of the communication channels indicates that that particular communication channel and the respective port on the server are not currently being used for data transmission by the server and are available; and establishing said allowed connection between the associated device and the available server port using one of the available communication channels determined to have the link pulses.

2. The method as set forth in claim 1 wherein the monitoring further comprises monitoring one of the plurality of communication channels at a time for the one or more link pulses.

3. The method as set forth in claim 2 wherein the monitoring further comprises disabling the other of the plurality of communication channels while the one of the plurality of communication channels is monitored for the one or more link pulses.

4. The method as set forth in claim 2 wherein the monitoring one of the plurality of communication channels is conducted by two or more of the controllers.

5. The method as set forth in claim 4 further comprising blocking the communication channel monitored to have the link pulses from propagating to a succeeding controller in the cascade.

6. The method as set forth in claim 1 further comprising providing an indication of which of the plurality of communication channels was the established communication channel for the associated device.

7. The method as set forth in claim 1, wherein said monitoring is performed for each of the associated devices, more than one of the associated devices are simultaneously connectable to different ones of the server ports determined to be available, and the communication channel of one of said simultaneously connected devices is formed through one of the inputs and outputs of a preceding one of the controllers in cascade.

8. The method as set forth in claim 1, wherein said monitored communication channels are external to the server.

9. A computer readable medium having stored therein instructions for providing network access by identifying at least one of a plurality of communication channels available for communication between one of a plurality of devices and a server, wherein the plurality of communication channels are formable between the server and cascadedly arranged controllers, each controller associated with one of the devices, including n inputs, n>1, and a switching device configured to allow connection between one of the n inputs and the associated device and connection through the controller between the remaining n−1 inputs and n−1 outputs, which when executed by one or more processors, causes the processors to perform the steps of:

monitoring, at each of the cascadedly arranged controllers, each of the plurality of communication channels between the controller and the server, wherein the n inputs of each succeeding controller in the cascade are respectively connected in series to n outputs of a preceding one of the controllers;

determining whether at least one of the plurality of communication channels is being used for the transmission of link pulses generated by the server, wherein the presence of link pulses on one of the communication channels indicates that that particular communication channel and a respective port on the server are not currently being used for data transmission by the server and are available; and establishing said allowed connection between the associated device and the available server port using one of the available communication channels determined to have the link pulses.

10. The computer readable medium as set forth in claim 9 wherein the monitoring further comprises monitoring one of the plurality of communication channels at a time for the one or more link pulses.

11. The computer readable medium as set forth in claim 10 wherein the monitoring further comprises disabling the other of the plurality of communication channels while the one of the plurality of communication channels is monitored for the one or more link pulses.

12. The computer readable medium as set forth in claim 10 wherein the monitoring one of the plurality of communication channels is conducted by two or more of the controllers.

13. The computer readable medium as set forth in claim 12 further comprising blocking the communication channel monitored to have the link pulses from propagating to a succeeding controller in the cascade.

14. The computer readable medium as set forth in claim 9 further comprising providing an indication of which of the plurality of communication channels was the established communication channel for the associated device.

15. The medium as set forth in claim 9, wherein said monitoring is performed for each of the associated devices, more than one of the associated devices are simultaneously connectable to different ones of the server ports determined to be available, and the communication channel of one of said simultaneously connected devices is formed through one of the inputs and outputs of a preceding one of the controllers in cascade.

16. The medium as set forth in claim 9, wherein said monitored communication channels are external to the server.

17. A system for identifying at least one of a plurality of communication channels available for communication between one of a plurality of devices and a server, the system comprising:

a plurality of controllers cascadedly arranged for forming a plurality of communication channels from the server, each controller associated with one of the devices, including n inputs, n>1, and a switching device configured to allow connection between one of the n inputs and the associated device and connection through the controller between the remaining n−1 inputs and n−1 outputs, and the n inputs of each succeeding controller in the cascade are respectively connected in series to n outputs of a preceding one of the controllers;

a monitoring system that monitors, at each of the controllers, each of the plurality of communication channels formed between the plurality of controllers and the server, and determines whether at least one of the plurality of communication channels is being used for the transmission of link pulses generated by the server, wherein the presence of link pulses on one of the communication channels indicates that that particular communication channel and a respective port on the server are not currently being used for data transmission by the server and are available; and at least one of the plurality of controllers establishes said allowed connection between the associated device and the available server port using one of the available communication channels determined to have the link pulses.

18. The system as set forth in claim 17 wherein the monitoring system monitors one of the plurality of communication channels at a time for the one or more link pulses.

19. The system as set forth in claim 18 wherein the monitoring system disables the other of the plurality of communication channels while the one of the plurality of communication channels is monitored for the one or more link pulses.

20. The system as set forth in claim 17 wherein each of the controllers has one of the monitoring systems.

21. The system as set forth in claim 20 further comprising a blocking system that blocks the communication channel monitored to have the link pulses from propagating to a succeeding controller in the cascade.

22. The system as set forth in claim 17 further comprising an indicator that indicates which of the plurality of communication channels was the established communication channel for the associated device.

23. The system as set forth in claim 17, wherein more than one of the associated devices are simultaneously connectable to different ones of the server ports determined to be available, and the communication channel of one of said simultaneously connected devices is formed through one of the inputs and outputs of a preceding one of the controllers in cascade.

24. The system as set forth in claim 17, wherein said monitored communication channels are external to the server.

* * * * *